US012525632B2

(12) United States Patent
Lee et al.

(10) Patent No.: US 12,525,632 B2
(45) Date of Patent: Jan. 13, 2026

(54) ZINC-BROMINE FLOW BATTERY INCLUDING CONDUCTIVE INTERLAYER

(71) Applicant: KOREA ELECTRONICS TECHNOLOGY INSTITUTE, Seongnam-si (KR)

(72) Inventors: Je-nam Lee, Seongnam-si (KR); Youngkwon Kim, Seongnam-si (KR); Eunbyul Do, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 594 days.

(21) Appl. No.: 17/821,882

(22) Filed: Aug. 24, 2022

(65) Prior Publication Data
US 2022/0407102 A1    Dec. 22, 2022

Related U.S. Application Data

(63) Continuation of application No. PCT/KR2020/002657, filed on Feb. 25, 2020.

(51) Int. Cl.
*H01M 8/18*    (2006.01)
*H01M 8/02*    (2016.01)

(52) U.S. Cl.
CPC ............ *H01M 8/188* (2013.01); *H01M 8/02* (2013.01)

(58) Field of Classification Search
None
See application file for complete search history.

(56) References Cited

U.S. PATENT DOCUMENTS

| 9,627,704 B2 | 4/2017 | Cole et al. |
| 2013/0252044 A1* | 9/2013 | Fujimoto ............ H01M 4/9016 29/623.1 |

FOREIGN PATENT DOCUMENTS

| CN | 202153549 U | 2/2012 |
| CN | 103137986 A | 6/2013 |
| KR | 101370851 B1 * | 3/2014 |
| KR | 10-1719887 B1 | 3/2017 |
| KR | 10-2029125 B1 | 10/2019 |

(Continued)

OTHER PUBLICATIONS

English translation of KR-101370851-B1 (Year: 2014).*

(Continued)

*Primary Examiner* — Ryan S Cannon
*Assistant Examiner* — Karen J. Armstrong
(74) *Attorney, Agent, or Firm* — Knobbe, Martens, Olson & Bear, LLP

(57) ABSTRACT

A zinc-bromine flow battery is proposed. The battery may include a conductive interlayer that can reduce the amount of inactive zinc in the form of dendrites on a negative electrode, thereby improving the zinc desorption process and improving the capacity and lifespan characteristics of the battery. The battery may include a membrane, a first electrode stacked on one side of the membrane, and a second electrode stacked on other side of the membrane. The battery may also include a conductive interlayer interposed between a negative electrode from among the first and second electrodes and the membrane and having a log value of hydrogen generation exchange current density of −4 or less in an acid-based electrolyte.

14 Claims, 7 Drawing Sheets

(56) References Cited

FOREIGN PATENT DOCUMENTS

KR          10-2020-073509 A        6/2020

OTHER PUBLICATIONS

"Titanium" Accessed Apr. 8, 2025, Millipore Sigma, www.sigmaaldrich.com/US/en/product/aldrich/gf16031843 (Year: 2025).*
International Search Report mailed Nov. 23, 2020 in International Application No. PCT/KR2020/002657.

* cited by examiner

ZINC-BROMINE FLOW BATTERY INCLUDING CONDUCTIVE INTERLAYER

CROSS REFERENCE TO RELATED APPLICATIONS

This is a continuation application of International Patent Application No. PCT/KR2020/002657, filed on Feb. 25, 2020, the contents of which are incorporated herein by reference in its entirety.

BACKGROUND

Technical Field

The present disclosure relates to a zinc-bromine flow battery, and more particularly, to a zinc-bromine flow battery including a conductive interlayer capable of reducing the amount of inactive zinc in the form of dendrites on a negative electrode, thereby improving the zinc desorption process and improving the capacity and lifespan characteristics of the battery.

Description of Related Technology

The redox flow battery refers to a battery capable of electrochemically converting chemical energy of an active material into electrical energy. In the redox flow battery, an electrolyte containing an active material causing an oxidation-reduction (redox) reaction circulates between a counter electrode and a storage tank to perform charging and discharging. A positive electrode electrolyte generates an electric current through the redox reaction on a positive electrode and is stored in a positive electrode electrolyte tank. A negative electrode electrolyte generates an electric current through the redox reaction on a negative electrode and is stored in a negative electrode electrolyte tank.

SUMMARY

One aspect is a zinc-bromine flow battery including a conductive interlayer capable of reducing the amount of inactive zinc in the form of dendrites on a negative electrode, thereby improving the zinc desorption process and improving the capacity and lifespan characteristics of the battery.

Another aspect is a zinc-bromine flow battery comprising a membrane; a first electrode stacked on one side of the membrane; a second electrode stacked on other side of the membrane; and a conductive interlayer interposed between a negative electrode from among the first and second electrodes and the membrane and having a log value of hydrogen generation exchange current density of −4 or less in an acid-based electrolyte.

The conductive interlayer has an electrical conductivity of 1 S/cm or more at room temperature.

The conductive interlayer is made of a metal or carbon material.

The metal material includes Ti, Zn, or SUS.

The carbon material includes carbon nanotubes, graphene, or graphite.

In the zinc-bromine flow battery according to the present disclosure, a zinc desorption capacity after initial five driving is 150% or less of a discharge capacity at a time of previous driving.

In the zinc-bromine flow battery according to the present disclosure, a driving current density is selected from 1 to 100 mA/cm$^2$, and a current density during desorption is ¼ or less of a driving current density.

The conductive interlayer has a form of a fiber sheet, foam, or mesh.

In addition, the present disclosure provides a zinc-bromine flow battery comprising a plurality of stacked unit cells each including a membrane, first and second electrodes disposed to face each other with the membrane interposed therebetween, and first and second flow frames combined with the first and second electrodes, respectively, to flow an electrolyte to the first and second electrodes; and a plurality of bipolar plates respectively interposed between the plurality of unit cells and disposed on both sides of the stacked plurality of unit cells. In this case, the unit cell includes a conductive interlayer interposed between a negative electrode from among the first and second electrodes and the membrane and having a log value of hydrogen generation exchange current density of −4 or less in an acid-based electrolyte.

According to the present disclosure, forming the conductive interlayer having electrical conductivity between the negative electrode and the membrane can increase the reaction area of the negative electrode and also improve the distribution of the electrolyte between the negative electrode and the membrane, thereby reducing the amount of inactive zinc in the form of dendrites and also improving the capacity and lifespan characteristics of the battery.

That is, the conductive interlayer can increase the activity because of the even distribution of the electrolyte and also increase the active area of the negative electrode to reduce the current density, thereby reducing the formation of inactive zinc dendrites during the charging process and also improving the charging and discharging efficiency characteristics. It is therefore possible to realize a high-performance zinc-bromine flow battery.

DETAILED DESCRIPTION

The redox flow battery is a secondary battery of a system in which a solution of two types of redox couple, which is an active material, reacts at the positive electrode and the negative electrode. The redox flow battery is a battery that is charged and discharged by supplying the redox couple solution from the outside of a battery cell. As the redox couple, Fe/Cr, V/Br, Zn/Br, Zn/Ce, V/V, etc. are used.

In a zinc-bromine flow battery using Zn/Br as the redox couple, an electrochemical reaction of "$2Br^- \rightarrow Br_2 + 2e^-$" occurs during charging, thereby producing bromine in the positive electrode electrolyte and storing it in the positive electrode electrolyte tank. At the negative electrode, an electrochemical reaction of "$Zn^{2+} + 2e^- \rightarrow Zn$" occurs, and thereby zinc ions contained in the negative electrode electrolyte are deposited as zinc. In this process, zinc dendrites are formed at the negative electrode.

The zinc dendrites increase the irreversibility of the charge and discharge reactions, thereby causing a decrease in the capacity and cycle life of the battery. Also, the zinc dendrites grow from the negative electrode toward the positive electrode, pierce a membrane, and are in contact with the positive electrode, causing a short circuit in the battery.

In the following description, only parts necessary to understand embodiments of the present disclosure will be described, and other parts will not be described to avoid obscuring the subject matter of the present disclosure.

Terms used herein should not be construed as being limited to their usual or dictionary meanings. In view of the fact that the inventor can appropriately define the meanings of terms in order to describe his/her own invention in the best way, the terms should be interpreted as meanings consistent with the technical idea of the present disclosure. In addition, the following description and corresponding drawings merely relate to specific embodiments of the present disclosure and do not represent all the subject matter of the present disclosure. Therefore, it will be understood that there are various equivalents and modifications of the disclosed embodiments at the time of the present application.

Now, embodiments of the present disclosure will be described in detail with reference to the accompanying drawings.

Figure 1:
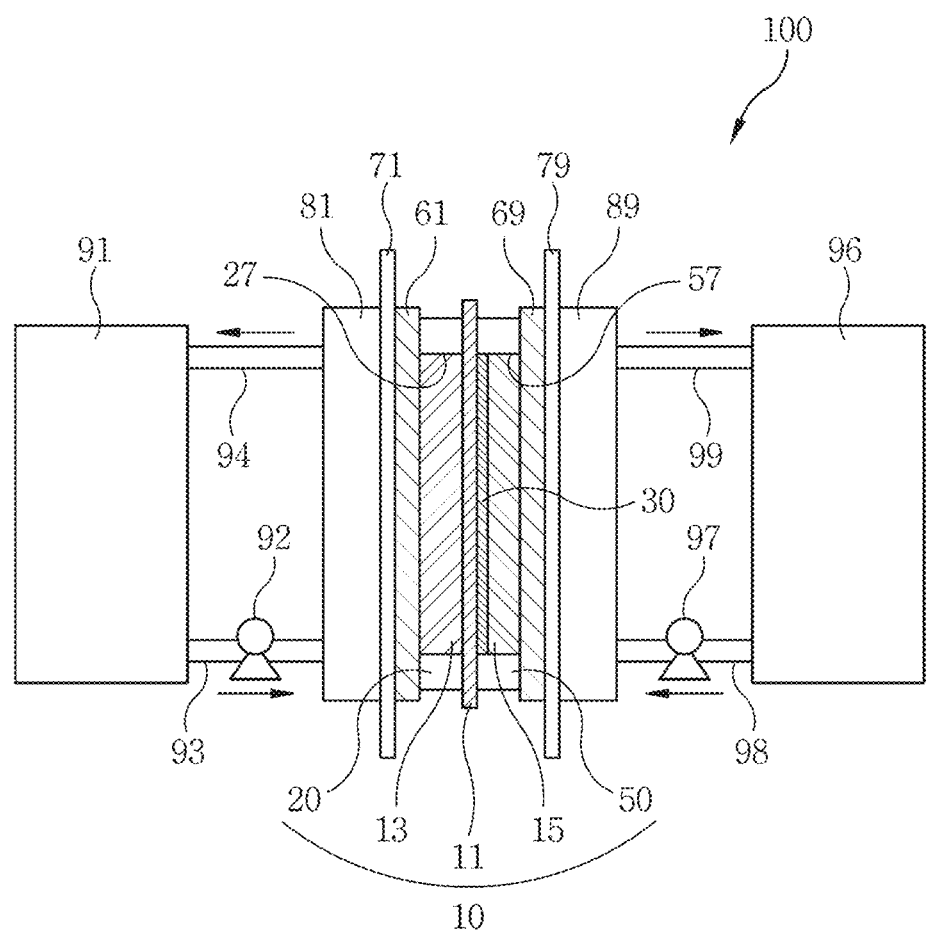
FIG. 1 is a diagram illustrating a zinc-bromine flow battery having one unit cell according to the present disclosure.

FIG. 1 is a diagram illustrating a zinc-bromine flow battery having one unit cell according to the present disclosure.

Referring to FIG. 1, a zinc-bromine flow battery 100 according to the present disclosure includes a membrane 11, a first electrode 13 stacked on one side of the membrane 11, a second electrode 15 stacked on the other side of the membrane 11, and a conductive interlayer 30 interposed between a negative electrode from among the first and second electrodes 13 and 15 and the membrane 11 and having a log value of hydrogen generation exchange current density of −4 or less in an acid-based electrolyte. The acid-based electrolyte may be 1M $H_2SO_4$.

The zinc-bromine flow battery 100 according to the present disclosure includes a unit cell 10 and a pair of bipolar plates 61 and 69 bonded to both sides of the unit cell 10, and may further include first and second current collectors 71 and 79, first and second cell frames 81 and 89, first and second electrolyte tanks 91 and 96, and first and second pumps 92 and 97, which are sequentially installed on the outside of the pair of bipolar plates 61 and 69.

The unit cell 10 includes the membrane 11, the first electrode 13, the second electrode 15, the conductive interlayer 30, a first flow frame 20, and a second flow frame 50. The first and second electrodes 13 and 15 are disposed to face each other with the membrane 11 interposed therebetween. The first and second flow frames 20 and 50 are combined with the first and second electrodes 13 and 15, respectively, to flow the electrolyte to the first and second electrodes 13 and 15. The first and second electrodes 13 and 15 have opposite polarities. For example, the first electrode 13 may be a positive electrode, and the second electrode 15 may be a negative electrode. The conductive interlayer 30 is interposed between the second electrode 15 and the membrane 11.

The membrane 11 separates a first electrolyte and a second electrolyte during charging or discharging, and allows only ions to be selectively moved during charging or discharging. The membrane 11 is a commonly used one and not particularly limited.

The first and second electrodes 13 and 15 provide active sites for oxidation and reduction of the first and second electrolytes, respectively. Carbon material electrodes may be used as the first and second electrodes 13 and 15. For example, a material of the first and second electrodes 13 and 15 may be, but is not limited to, activated carbon, graphite, hard carbon, or porous carbon. The porous carbon material includes carbon felt, carbon cloth, or carbon paper. Preferably, carbon felt or carbon paper may be used as a carbon material of the first and second electrodes 13 and 15.

In order to increase the reaction area of the second electrode 15, which is the negative electrode, and also to improve the distribution of the electrolyte between the second electrode 15 and the membrane 11, the conductive interlayer 30 has a log value of hydrogen generation exchange current density of −4 or less in an acid-based electrolyte and also has an electrical conductivity of 1 S/cm or more at room temperature. The conductive interlayer 30 may be made of a metal or carbon material. For example, the metal material includes, but is not limited to, Ti, Zn, or SUS. The carbon material includes, but is not limited to, carbon nanotubes, graphene, or graphite.

The conductive interlayer 30 may be implemented in the form of a fiber sheet, foam, or mesh, but is not limited thereto.

As described above, by having effects of increasing the reaction area of the second electrode 15 and also improving the distribution of the electrolyte between the second electrode 15 and the membrane 11, the conductive interlayer 30 can reduce the amount of inactive zinc in the form of dendrites and also improve the capacity and lifespan characteristics of the battery.

That is, the conductive interlayer 30 can increase the activity because of the even distribution of the electrolyte and also increase the active area of the second electrode 15 to reduce the current density, thereby reducing the formation of inactive zinc dendrites during the charging process and also improving the charging and discharging efficiency characteristics. In addition, the conductive interlayer 30 can improve energy density and reversibility.

In addition, the first and second flow frames 20 and 50 respectively have first and second electrode insertion holes 27 and 57 in which the first and second electrodes 13 and 15 are inserted and installed, respectively. The first and second flow frames 20 and 50 respectively have flow paths through which the first and second electrolytes flow to the first and second electrodes 13 and 15 inserted into the first and second electrode insertion holes 27 and 57, respectively. A material of the first and second flow frames 20 and 50 may be, but is not limited to, a plastic resin such as polyethylene (PE), polypropylene (PP), polystyrene (PS), or vinyl chloride (PVC).

In the zinc-bromine flow battery 100, the first and second electrolytes may be a $ZnBr_2$ aqueous solution, and additives such as complexing agents for suppressing the generation of bromine in the $ZnBr_2$ aqueous solution, and a conductive agent for improving the conductivity of the electrolyte may be included. As an additive, $ZnCl_2$, quaternary ammonium bromide (QBr), etc. may be used. For example, an electrolyte in which $ZnCl_2$ and QBr are added to a 2-3M $ZnBr_2$ aqueous solution may be used.

The pair of bipolar plates 61 and 69 are stacked on the outside of the first and second flow frames 20 and 50. A conductive plate may be used as the bipolar plates 61 and 69. A conductive graphite plate may be used as a material of the bipolar plates 61 and 69. For example, the bipolar plates 61 and 69 may be graphite plates impregnated with phenol resin. In case of using the graphite plate alone as the bipolar plates 61 and 69, the strong acid used in the electrolyte may permeate the graphite plate. Therefore, in order to prevent the permeation of strong acids, it is preferable to use the graphite plate impregnated with phenol resin as the bipolar plates 61 and 69.

In the first electrode 13 inserted into the first electrode insertion hole 27 of the first flow frame 20, both sides of the first electrode 13 exposed to the outside through the first electrode insertion hole 27 are in contact with the membrane 11 and the bipolar plate 61, respectively. In order to prevent the first electrolyte from leaking through interfaces among the membrane 11, the first flow frame 20, and the bipolar plates 61, a gasket may be interposed between the first flow frame 20 and the membrane 11 and between the first flow frame 20 and the bipolar plate 61.

Similarly, in the second electrode 15 inserted into the second electrode insertion hole 57 of the second flow frame 50, both sides of the second electrode 15 exposed to the outside through the second electrode insertion hole 57 are in contact with the membrane 11 and the bipolar plate 69, respectively. In order to prevent the second electrolyte from leaking through interfaces among the membrane 11, the second flow frame 50, and the bipolar plates 69, a gasket may be interposed between the second flow frame 50 and the membrane 11 and between the second flow frame 50 and the bipolar plate 69.

The first and second current collectors 71 and 79 are stacked on the outside of the pair of bipolar plates 61 and 69. The first and second current collectors 71 and 79 are passages through which electrons move, and serve to receive electrons from the outside during charging or release electrons to the outside during discharging. As the first and second current collectors 71 and 79, a conductive metal plate made of copper or brass may be used.

The first and second cell frames 81 and 89 are combined with the outside of the first and second current collectors 71 and 79. The first and second cell frames 81 and 89 fix the unit cell 10, the pair of bipolar plates 61 and 69, and the first and second current collectors 71 and 79, all of which are interposed therebetween. Each of the first and second cell frames 81 and 89 has an inlet and an outlet for injecting and flowing out the first or second electrolyte into the first or second flow frame 20 or 50 of the unit cell 10. An insulator may be used as a material of the first and second cell frames 81 and 89. For example, a material of the first and second cell frames 81 and 89 may be, but is not limited to, polyethylene (PE), polypropylene (PP), polystyrene (PS), or vinyl chloride (PVC).

The first electrolyte tank 91 circulates the first electrolyte to the first cell frame 81 through a first inlet pipe 93 and a first outlet pipe 94 respectively connected to the inlet and outlet formed in the first cell frame 81. Also, a first pump 92 for circulating the first electrolyte is connected to the first inlet pipe 93.

Similarly, the second electrolyte tank 96 circulates the second electrolyte to the second cell frame 89 through a second inlet pipe 98 and a second outlet pipe 99 respectively connected to the inlet and outlet formed in the second cell frame 89. Also, a second pump 97 for circulating the second electrolyte is connected to the second inlet pipe 98.

The zinc-bromine flow battery 100 according to the present disclosure circulates the first and second electrolytes as follows. The first electrolyte supplied from the first electrolyte tank 91 is injected into the inlet of the first cell frame 81 through the first inlet pipe 93 by the operation of the first pump 92. The first electrolyte injected into the inlet of the first cell frame 81 passes through the first current collector 71 and the first bipolar plate 61 and then passes through the first flow frame 20 and the first electrode 13 in the unit cell 10. The first electrolyte that has passed through the first electrode 13 then flows out to the first outlet pipe 94 through the first flow frame 20, the first bipolar plate 61, the first current collector 71, and the outlet of the first cell frame 81. The first electrolyte discharged through the first outlet pipe 94 enters the first electrolyte tank 91.

The second electrolyte supplied from the second electrolyte tank 96 is injected into the inlet of the second cell frame 89 through the second inlet pipe 98 by the operation of the second pump 97. The second electrolyte injected into the inlet of the second cell frame 89 passes through the second current collector 79 and the second bipolar plate 69 and then passes through the second flow frame 50 and the second electrode 15 in the unit cell 10. The second electrolyte that has passed through the second electrode 15 then flows out to the second outlet pipe 99 through the second flow frame 50, the second bipolar plate 69, the second current collector 79, and the outlet of the second cell frame 89. The second electrolyte discharged through the second outlet pipe 99 enters the second electrolyte tank 96.

In the zinc-bromine flow battery 100 according to the present disclosure, the zinc desorption capacity after the initial five driving is 150% or less of the discharge capacity at the time of the previous driving. Also, in the zinc-bromine flow battery 100 according to the present disclosure, a driving current density may be selected from 1 to 100 $mA/cm^2$, and a current density during desorption is ¼ or less of the driving current density.

Meanwhile, FIG. 1 shows an example in which the zinc-bromine flow battery 100 includes one unit cell 10, but this is not considered as a limitation. Alternatively, as shown in FIG. 2, the zinc-bromine flow battery 200 may have a structure in which a plurality of unit cells 10 are stacked.

Figure 2:
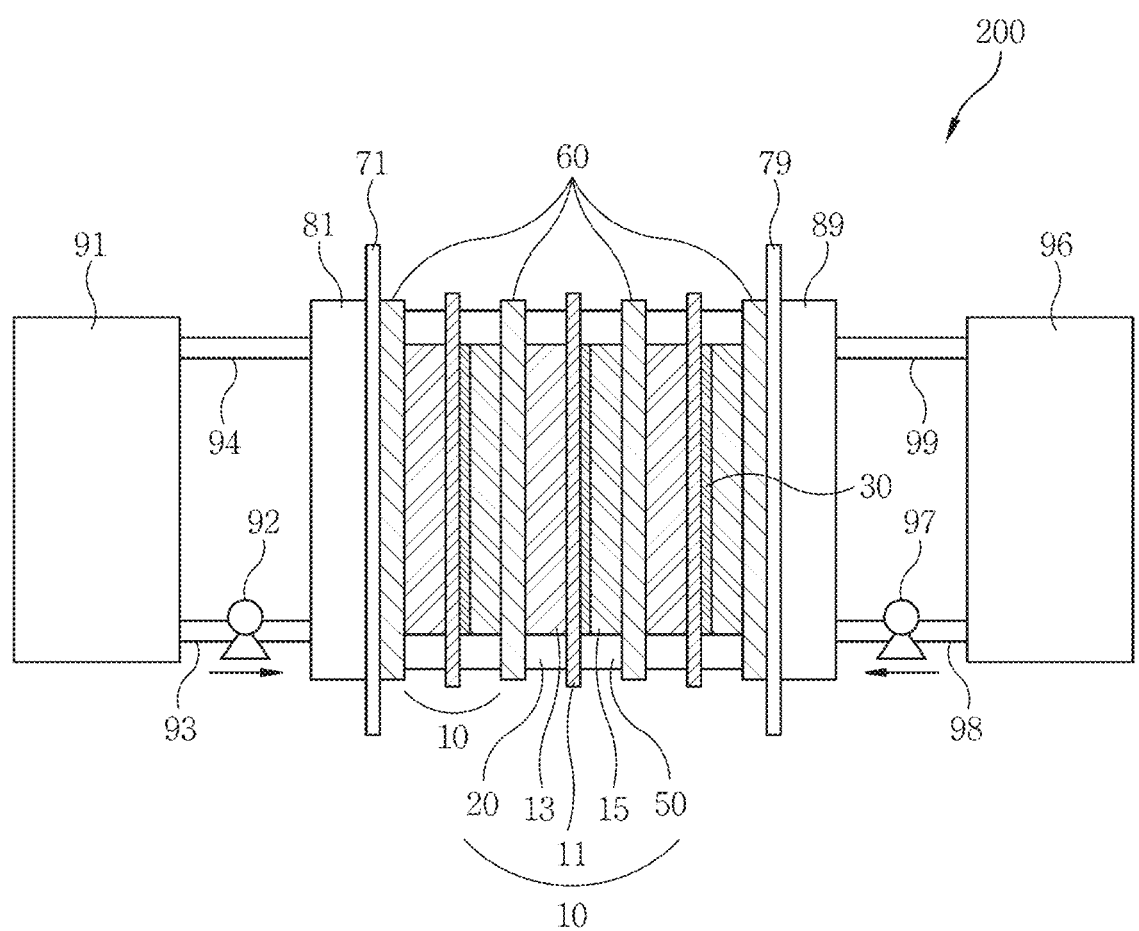
FIG. 2 is a diagram illustrating a zinc-bromine flow battery having a plurality of unit cells according to the present disclosure.

FIG. 2 is a diagram illustrating a zinc-bromine flow battery 200 having a plurality of unit cells 10 according to the present disclosure.

Referring to FIG. 2, the zinc-bromine flow battery 200 has the same structure as the zinc-bromine flow battery 100 shown in FIG. 1, except that bipolar plates 60 are respectively interposed between the plurality of unit cells 10 and that a pair of bipolar plates 60 are disposed on both sides of the stacked plurality of unit cells 10. That is, in the zinc-bromine flow battery 200, the first and second current collectors 71 and 79, the first and second cell frames 81 and 89, and the first and second electrolyte tanks 91 and 96 are connected on the pair of bipolar plates 60 positioned on both sides of the stacked plurality of unit cells 10.

Meanwhile, although FIG. 2 exemplarily shows the zinc-bromine flow battery 200 in which three unit cells 10 are stacked, this is not considered as a limitation. That is, any other zinc-bromine flow battery may be implemented by stacking two or more unit cells 10.

In order to confirm the performance of the zinc-bromine flow battery including the conductive interlayer 30 according to the present disclosure as described above, the zinc-bromine flow batteries according to a comparative example and an embodiment were prepared and electrochemical characteristics were evaluated.

As to the positive electrode, a carbon paper electrode was used, and a bipolar plate having a flow path was used. As to the negative electrode, a carbon paper electrode was used, and a bipolar plate without a flow path was used. As the interlayer between the membrane and the negative electrode, a normal plastic mesh (in case of a comparative example) was used, and a titanium (Ti) mesh (in case of an embodiment) was used. A mixed solution of 2.25M $ZnBr_2$ and 3M KCl was used as the basic electrolyte.

Figure 3:
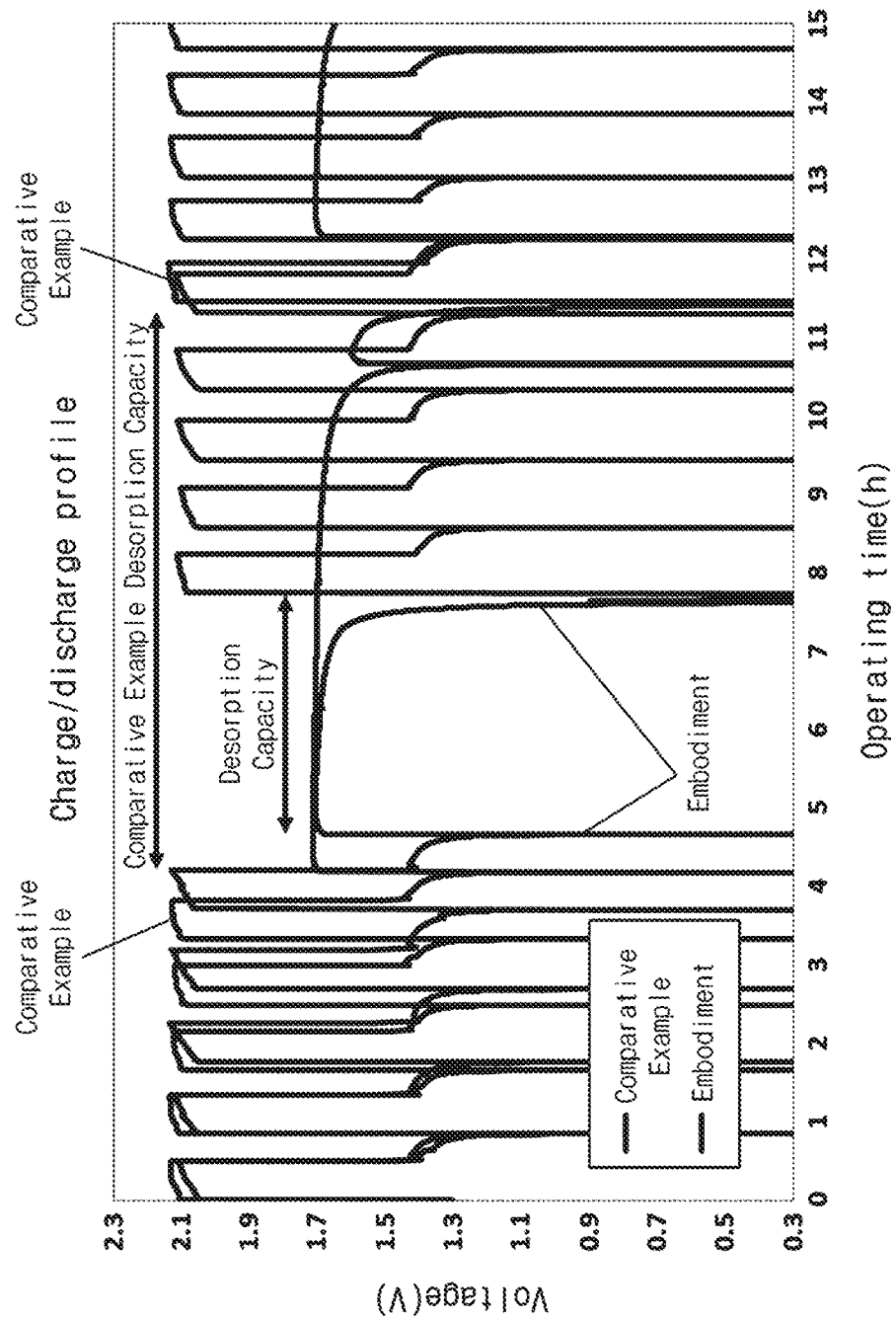
FIG. 3 is a graph measuring the zinc desorption capacity of zinc-bromine flow batteries according to a comparative example and an embodiment.
Figure 4:
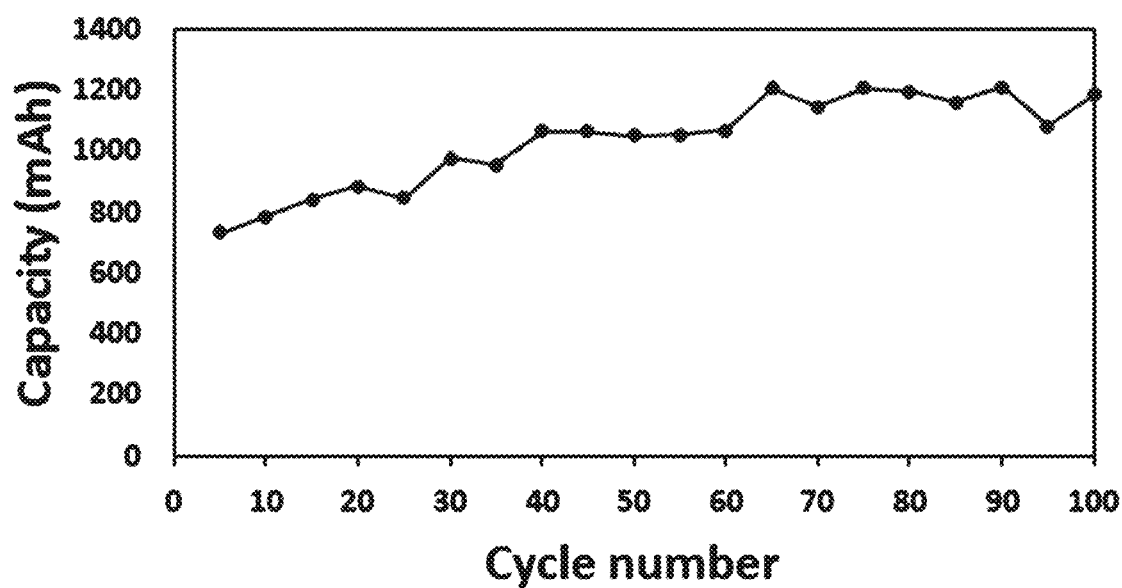
FIG. 4 is a graph of measuring the zinc desorption capacity after 5 cycles of charging and discharging in a zinc-bromine flow battery according to a comparative example.
Figure 5:
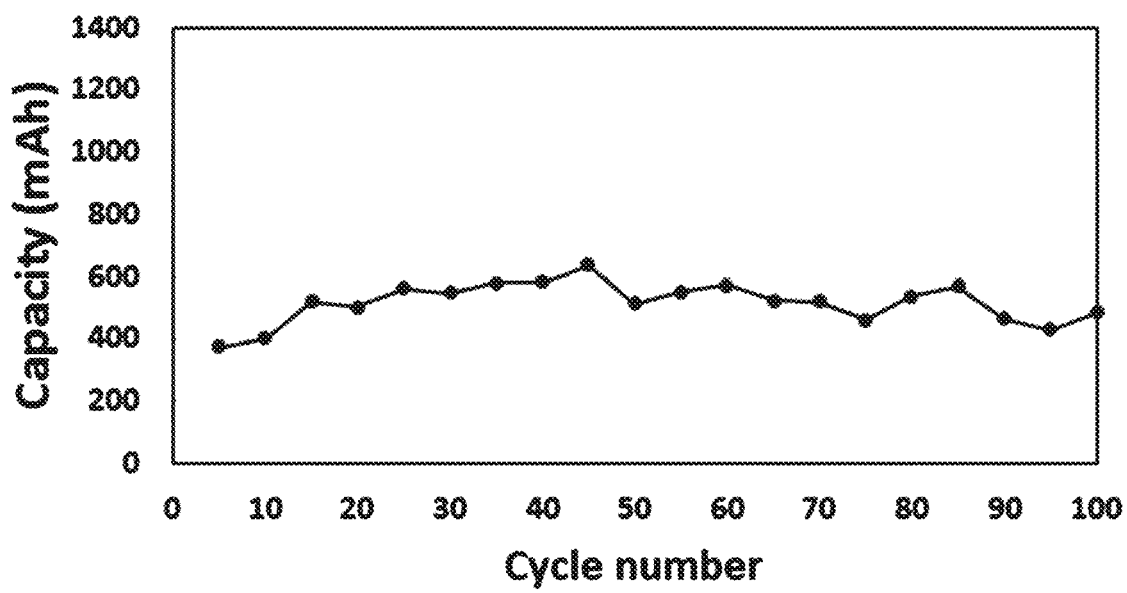
FIG. 5 is a graph of measuring the zinc desorption capacity after 5 cycles of charging and discharging in a zinc-bromine flow battery according to an embodiment.

Long-term lifespan was evaluated while the zinc desorption process was performed once every five cycles, and the results are shown in graphs of FIGS. 3 to 5. FIG. 3 is a graph measuring the zinc desorption capacity of zinc-bromine flow batteries according to a comparative example and an embodiment. FIG. 4 is a graph of measuring the zinc desorption capacity after 5 cycles of charging and discharging in a zinc-bromine flow battery according to a comparative example. FIG. 5 is a graph of measuring the zinc desorption capacity after 5 cycles of charging and discharging in a zinc-bromine flow battery according to an embodiment.

Referring to FIGS. 3 to 5, it was confirmed that the zinc desorption capacity in the embodiment using the titanium mesh was decreased compared to the zinc desorption capacity in the comparative example. That is, in case of the embodiment, the zinc desorption capacity after the initial five driving is 150% or less of the discharge capacity at the time of the previous driving.

As such, by introducing the titanium mesh-based conductive interlayer in the embodiment, it was confirmed that the zinc desorption capacity related to the formation of zinc dendrites was reduced when compared to the comparative example.

Figure 6:
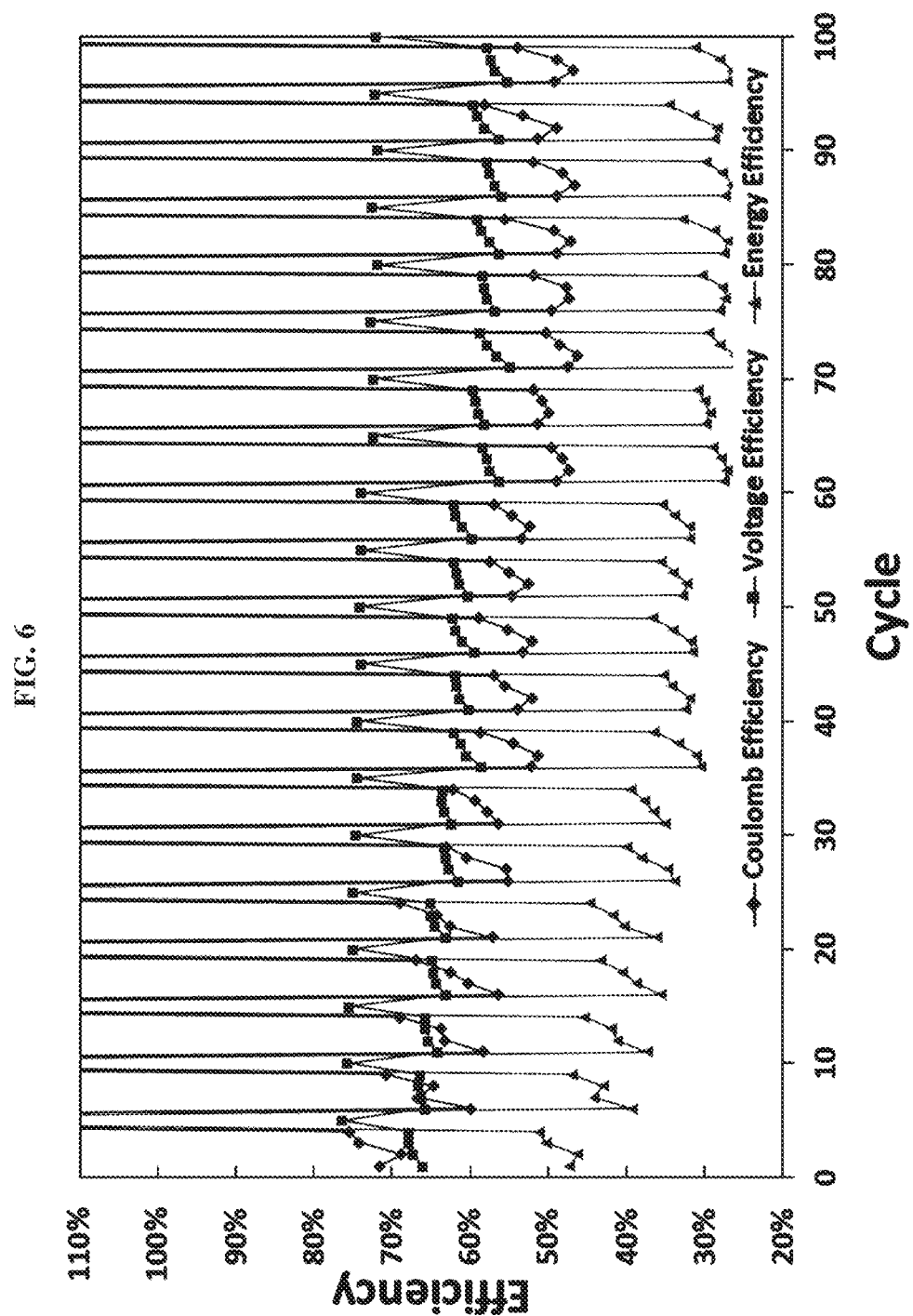
FIG. 6 is a graph of measuring the efficiency characteristics of a zinc-bromine flow battery according to a comparative example when driven at a current density of 40 mA/cm$^2$.
Figure 7:
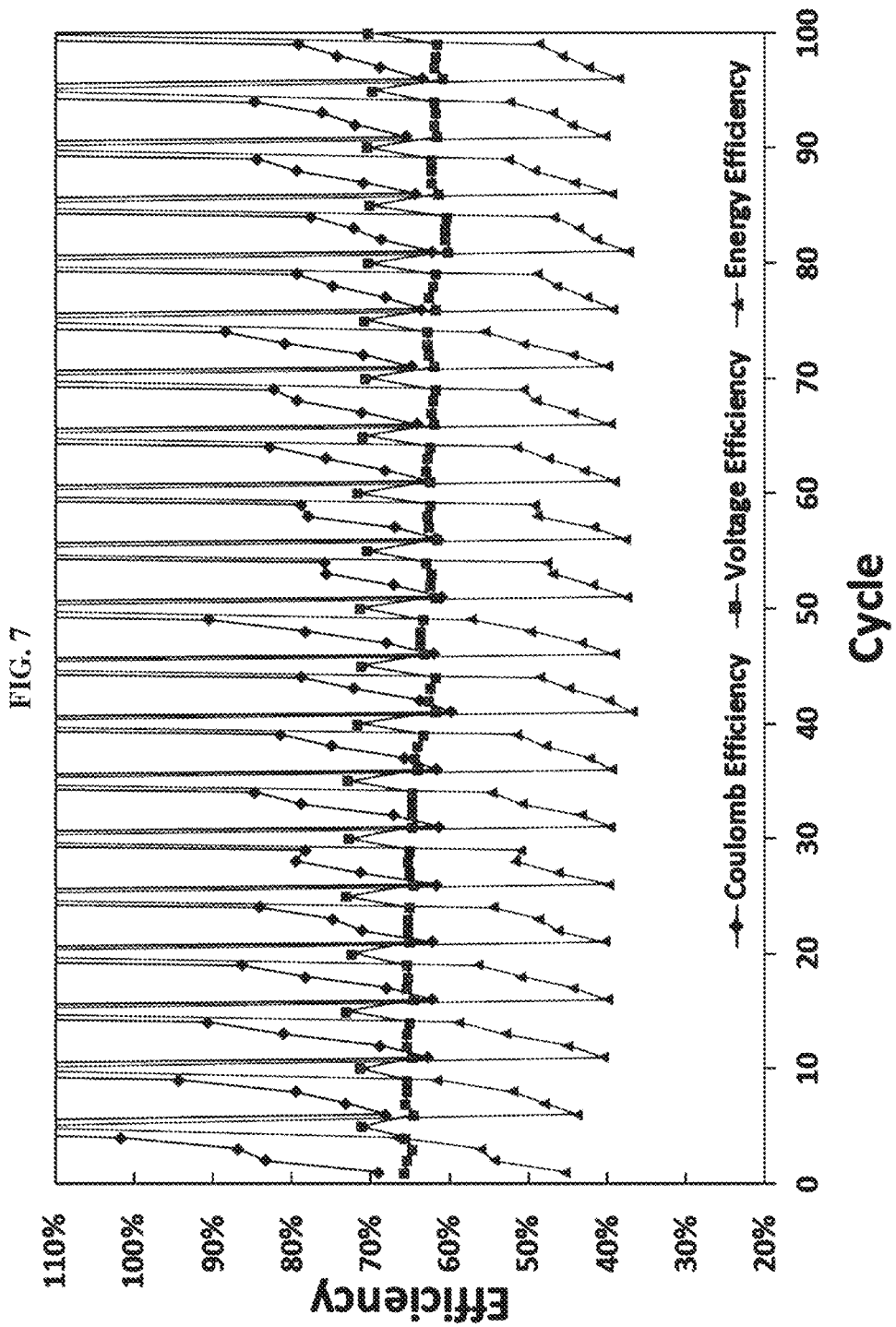
FIG. 7 is a graph of measuring the efficiency characteristics of a zinc-bromine flow battery according to an embodiment when driven at a current density of 40 mA/cm$^2$.

The results of comparing the efficiency characteristics when driving at a current density of 40 $mA/cm^2$ by introducing the interlayer according to each of the comparative example and the embodiment are as shown in the graphs of FIGS. 6 and 7. FIG. 6 is a graph of measuring the efficiency characteristics of a zinc-bromine flow battery according to a comparative example when driven at a current density of 40 $mA/cm^2$. FIG. 7 is a graph of measuring the efficiency characteristics of a zinc-bromine flow battery according to an embodiment when driven at a current density of 40 $mA/cm^2$.

Referring to FIGS. 6 and 7, compared with the comparative example, it was confirmed that the embodiment has an improvement effect in terms of coulomb efficiency, voltage efficiency, and energy efficiency.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. A zinc-bromine flow battery comprising:
   a membrane;
   a first electrode stacked on a first side of the membrane;
   a second electrode stacked on a second side of the membrane, the second side opposing the first side, one of the first electrode or the second electrode configured to function as a negative electrode;
   an acid-based electrolyte in fluid communication with the first electrode and the second electrode such that the first electrode and the second electrode react with the acid-based electrolyte; and
   a conductive interlayer interposed only between and in direct physical contact with the negative electrode and the membrane such that the conductive interlayer is not formed between the first electrode and the membrane,
   the conductive interlayer formed of a material different from the negative electrode,
   the conductive interlayer configured to increase a reaction area of the negative electrode with respect to the acid-based electrolyte,
   the conductive interlayer configured to increase a distribution of the acid-based electrolyte between the negative electrode and the membrane,
   the conductive interlayer configured to have a log value of hydrogen generation exchange current density of −4 or less when the negative electrode reacts with the acid-based electrolyte through the conductive interlayer.

2. The zinc-bromine flow battery of claim 1, wherein the conductive interlayer has an electrical conductivity of 1 S/cm or more at room temperature.

3. The zinc-bromine flow battery of claim 2, wherein the conductive interlayer comprises a metal or carbon material.

4. The zinc-bromine flow battery of claim 3, wherein the metal material includes Ti, Zn, or SUS, and wherein the carbon material includes carbon nanotubes, graphene, or graphite.

5. The zinc-bromine flow battery of claim 4, wherein a zinc desorption capacity after initial five driving is 150% or less of a discharge capacity at a time of previous driving.

6. The zinc-bromine flow battery of claim 5, wherein a driving current density is selected from 1 $mA/cm^2$ to 100 $mA/cm^2$, and wherein a current density during desorption is ¼ or less of a driving current density.

7. The zinc-bromine flow battery of claim 1, wherein the conductive interlayer has a form of a fiber sheet, foam, or mesh.

8. The zinc-bromine flow battery of claim 1, wherein the conductive interlayer has a width less than that of the negative electrode.

9. The zinc-bromine flow battery of claim 1, further comprising:
   a first bipolar plate coupled to the positive electrode;
   a second bipolar plate coupled to the negative electrode;
   a first current collector coupled to the first bipolar plate;
   a second current collector coupled to the second bipolar plate;
   a first cell frame coupled to the first current collector and comprising an inlet and an outlet;
   a second cell frame coupled to the second current collector and comprising an inlet and an outlet;
   a first electrolyte tank configured to store a first electrolyte and circulate the first electrolyte to the first cell frame through a first inlet pipe and a first outlet pipe respectively connected to the inlet and outlet of the first cell frame; and
   a second electrolyte tank configured to store a second electrolyte and circulate the second electrolyte to the second cell frame through a second inlet pipe and a second outlet pipe respectively connected to the inlet and outlet of the second cell frame.

10. The zinc-bromine flow battery of claim 1, wherein the conductive interlayer is shorter in length than the membrane.

11. A zinc-bromine flow battery comprising:
a plurality of stacked unit cells each including a membrane, first and second electrodes disposed to face each other with the membrane interposed therebetween, and first and second flow frames combined with the first and second electrodes, respectively, to flow an acid-based electrolyte to the first and second electrodes, one of the first electrode or the second electrode configured to function as a negative electrode; and
a plurality of bipolar plates respectively interposed between the plurality of unit cells and disposed on both sides of the stacked plurality of unit cells,
wherein the unit cell includes:
a conductive interlayer interposed only between and in direct physical contact with the negative electrode and the membrane such that the conductive interlayer is not formed between the first electrode and the membrane,
the conductive interlayer formed of a material different from the negative electrode,
the conductive interlayer configured to increase a reaction area of the negative electrode with respect to the acid-based electrolyte,
the conductive interlayer configured to increase a distribution of the acid-based electrolyte between the negative electrode and the membrane,
the conductive interlayer configured to have a log value of hydrogen generation exchange current density of −4 or less when the negative electrode reacts with the acid-based electrolyte through the conductive interlayer.

12. The zinc-bromine flow battery of claim 11, wherein the conductive interlayer has an electrical conductivity of 1 S/cm or more at room temperature.

13. The zinc-bromine flow battery of claim 12, wherein the conductive interlayer has a form of a fiber sheet, foam, or mesh.

14. The zinc-bromine flow battery of claim 12, wherein a zinc desorption capacity after initial five driving is 150% or less of a discharge capacity at a time of previous driving.

* * * * *